(12) United States Patent
Ben-Zvi et al.

(10) Patent No.: US 9,038,168 B2
(45) Date of Patent: May 19, 2015

(54) CONTROLLING RESOURCE ACCESS BASED ON RESOURCE PROPERTIES

(75) Inventors: Nir Ben-Zvi, Redmond, WA (US); Raja Pazhanivel Perumal, Issaquah, WA (US); Anders Samuelsson, Redmond, WA (US); Jeffrey B. Hamblin, Issaquah, WA (US); Ran Kalach, Bellevue, WA (US); Ziquan Li, Redmond, WA (US); Matthias H. Wollnik, Seattle, WA (US); Clyde Law, Seattle, WA (US); Paul Adrian Oltean, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 737 days.

(21) Appl. No.: 12/622,441

(22) Filed: Nov. 20, 2009

(65) Prior Publication Data

US 2011/0126281 A1    May 26, 2011

(51) Int. Cl.
*G06F 12/14*    (2006.01)
*G06F 21/62*    (2013.01)

(52) U.S. Cl.
CPC .... *G06F 21/6218* (2013.01); *G06F 2221/2141* (2013.01)

(58) Field of Classification Search
USPC .............................................. 726/21, 26, 30
See application file for complete search history.

(56) References Cited

U.S. PATENT DOCUMENTS

| | | | |
|---|---|---|---|
| 3,976,009 A * | 8/1976 | Delgado et al. ............... | 102/395 |
| 5,052,040 A | 9/1991 | Preston et al. | |
| 5,889,952 A * | 3/1999 | Hunnicutt et al. ............ | 709/219 |
| 5,991,877 A | 11/1999 | Luckenbaugh | |
| 6,786,586 B2 * | 9/2004 | Koga et al. ...................... | 347/95 |
| 6,895,503 B2 * | 5/2005 | Tadayon et al. ............... | 713/168 |
| 6,928,427 B2 | 8/2005 | Rajasekaran et al. | |
| 7,016,893 B2 * | 3/2006 | Boreham et al. ....................... | 1/1 |
| 7,035,850 B2 * | 4/2006 | Arai et al. .............................. | 1/1 |

(Continued)

FOREIGN PATENT DOCUMENTS

CN        1782943 A    6/2006
CN      101114295 A    1/2008

(Continued)

OTHER PUBLICATIONS

Burnside, et al., "Access-Controlled Resource Discovery", Retrieved at <<http://csg.csail.mit.edu/pubs/reports/search3.pdf>> MIT Laboratory for Computer Science, Mar. 2002, pp. 137-138.

(Continued)

*Primary Examiner* — Jason K. Gee
*Assistant Examiner* — Sharif E Ullah
(74) *Attorney, Agent, or Firm* — Timothy Churna; Kate Drakos; Micky Minhas

(57) ABSTRACT

Described is a technology by which access to a resource is determined by evaluating a resource label of the resource against a user claim of an access request, according to policy decoupled from the resource. The resource may be a file, and the resource label may be obtained by classifying the file into classification properties, such that a change to the file may change its resource label, thereby changing which users have access to the file. The resource label-based access evaluation may be logically combined with a conventional ACL-based access evaluation to determine whether to grant or deny access to the resource.

20 Claims, 3 Drawing Sheets

(56) References Cited

U.S. PATENT DOCUMENTS

| | | | |
|---|---|---|---|
| 7,069,330 B1* | 6/2006 | McArdle et al. | 709/229 |
| 7,124,192 B2 | 10/2006 | High, Jr. et al. | |
| 7,185,192 B1* | 2/2007 | Kahn | 713/155 |
| 7,380,271 B2* | 5/2008 | Moran et al. | 726/4 |
| 7,409,390 B2* | 8/2008 | Kudoh et al. | 1/1 |
| 7,593,942 B2 | 9/2009 | Sack et al. | |
| 7,716,240 B2* | 5/2010 | Lim | 707/781 |
| 7,779,265 B2* | 8/2010 | Dubhashi et al. | 713/182 |
| 7,792,861 B2* | 9/2010 | Kudoh et al. | 707/786 |
| 7,827,598 B2* | 11/2010 | Moran et al. | 726/4 |
| 7,877,781 B2* | 1/2011 | Lim | 726/1 |
| 7,934,249 B2* | 4/2011 | Chan et al. | 726/1 |
| 2001/0025311 A1* | 9/2001 | Arai et al. | 709/225 |
| 2002/0077803 A1* | 6/2002 | Kudoh et al. | 704/1 |
| 2003/0088786 A1* | 5/2003 | Moran et al. | 713/201 |
| 2004/0073668 A1 | 4/2004 | Bhat | |
| 2006/0230282 A1* | 10/2006 | Hausler | 713/182 |
| 2006/0294194 A1* | 12/2006 | Graveline et al. | 709/217 |
| 2007/0136578 A1* | 6/2007 | Dubhashi et al. | 713/167 |
| 2007/0156694 A1* | 7/2007 | Lim | 707/9 |
| 2007/0156897 A1 | 7/2007 | Lim | |
| 2007/0179954 A1* | 8/2007 | Kudoh et al. | 707/9 |
| 2008/0034438 A1 | 2/2008 | Mireku | |
| 2008/0060080 A1* | 3/2008 | Lim | 726/26 |
| 2008/0066148 A1* | 3/2008 | Lim | 726/1 |
| 2008/0109897 A1* | 5/2008 | Moran et al. | 726/19 |
| 2008/0155687 A1* | 6/2008 | Lambourn et al. | 726/21 |
| 2008/0294586 A1* | 11/2008 | Lim | 706/47 |
| 2008/0301760 A1* | 12/2008 | Lim | 726/1 |
| 2008/0313107 A1* | 12/2008 | Futatsugi | 706/11 |
| 2009/0055937 A1* | 2/2009 | Samuel | 726/28 |
| 2009/0183184 A1 | 7/2009 | Nadalin et al. | |
| 2009/0193493 A1 | 7/2009 | Becker | |
| 2009/0271863 A1* | 10/2009 | Govindavajhala et al. | 726/23 |
| 2010/0325686 A1* | 12/2010 | Davis et al. | 726/1 |

FOREIGN PATENT DOCUMENTS

| | | |
|---|---|---|
| CN | 101448002 A | 6/2009 |
| JP | 2007-293630 A | 11/2007 |

OTHER PUBLICATIONS

"What is the Windows Integrity Mechanism?", Retrieved at <<http://msdn.microsoft.com/en-us/library/bb625957.aspx>> Oct. 13, 2009, pp. 3.

"Logical Access Control", retrieved at <<http://csrc.nist.gov/publications/nistpubs/800-12/800-12-html/chapter17.html>> Jul. 6, 2007, pp. 14.

"Mandatory, Discretionary, Role and Rule Based Access Control", Retrieved at <<http://www.techotopia.com/index.php/Mandatory,_Discretionary,_Role_and_Rule_Based_Access_Control>> Oct. 12, 2009, pp. 4.

"What's New in File Server Resource Manager in Windows Server 2008 R2", Retrieved at <<http://technet.microsoft.com/en-us/library/dd464014.aspx>> Feb. 7, 2009, pp. 2.

"Office Action Received for European Patent Application No. 10831970.8", Mailed Date: May 30, 2014, Filed Date: Oct. 29, 2010, 4 Pages.

"Office Action Received for Japan Patent Application No. 2012-539924", Mailed Date: Apr. 15, 2014, Filed Date: Oct. 29, 2010, 11 Pages.

Hart, et al., "More Content—Less Control: Access Control in the Web 2.0", In IEEE Symposium on Security and Privacy Workshop on Web 2.0 Security, Jan. 1, 2007, pp. 1-3.

"Second Office Action Received for China Patent Application No. 201080052356.X", Mailed Date: Sep. 23, 2013, Filed Date: Oct. 29, 2010, 13 Pages.

"Third Office Action Received for China Patent Application No. 201080052356.X", Mailed Date: Jan. 30, 2014, Filed Date: Oct. 29, 2010, 8 Pages.

"International Search Report", Mailed: Jun. 23, 2011, Application No. PCT/US2010/054722, Filed Date: Oct. 29, 2011.

"Fifth Office Action and Search Report Issued in Chinese Patent Application No. 201080052356.X", Mailed Date: Dec. 15, 2014, 14 Pages.

"Fourth Office Action and Search Report Issued in Chinese Patent Application No. 201080052356.X", Mailed Date: Jul. 8, 2014, 15 Pages.

* cited by examiner

CONTROLLING RESOURCE ACCESS BASED ON RESOURCE PROPERTIES

BACKGROUND

In a typical enterprise environment, the amount of data that is maintained and processed is enormous and rapidly increasing. Information technology (IT) departments to have to deal with many millions or even billions of files, in dozens of formats. Moreover, the existing number tends to grow at a significant (e.g., double-digit yearly growth) rate.

With such data size and growth, a number of complex scenarios need to be considered by IT departments, including with respect to compliance, security, and storage. These scenarios are relevant for unstructured data (e.g., files), semi-structured data (e.g., files with property repositories) and structured data (e.g., databases). Often these data are not actively managed, and are kept in unstructured form in file shares.

To manage access to resources (objects) such as files, present security models are based on having access control policies on the objects that allow legitimate users to have access while restricting the access of unauthorized users. However, in addition to securing access based on business policy via an access control list (ACL) on the resource containing the data, enterprises also are looking to secure data based on content sensitivity.

By way of example, consider a file with a security policy that grants read access to several hundred users in a security group. If at some time the file contents are inadvertently updated such that the file exposes customer record data, a company may no longer want to provide such access to the entire security group. However there is no automatic mechanism for detecting the content change and then revising the security policy.

Changed content in a file may have other implications on how a company would like data to be handled. For example, a company may want a change in content that adds sensitive data to alter how the data may be distributed, such as to prevent a file containing the data from being attached in an email, or copied onto a portable storage device (e.g., a USB device) in clear text.

Preventing access and/or distribution as a result of changed content is not possible with existing security models. This results in unintended information leakage and insider breach of data, and is a significant issue facing a number of enterprises and the like, including in regulated industries and in the public sector.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which access to a resource is determined based on policy for evaluating a resource label associated with the resource against a user claim associated with an access request to that resource. In one implementation, the policy is decoupled from the resource, and maintained separately/independently from the resource, providing a way to apply the same policy to multiple resources.

The resource may be a file, and the resource label may be obtained by classifying the file into classification properties. In this manner, for example, a content change to the file leads to a reclassification which may change its resource label, thereby changing which users have access to the file according to their respective user claim or claims.

The access may be determined from policy, which may specify access based solely on the resource label versus user claim evaluation, or in combination with one or more other evaluation results. For example, an access control list versus user token evaluation may further be used in determining whether to grant or deny access. Thus, for example, policy may specify that a user be both a member of a user group (ACL-based evaluation) and have a sufficient clearance level versus a resource sensitivity level (resource label-based evaluation) to obtain access. In another example, policy may specify that a user either be a member of a user group (ACL-based evaluation) or be identified as a member of a certain project (resource label-based evaluation) to obtain access.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards applying an access policy to a resource based on a classification property set (one or more classification properties) that is obtained by classifying the resource. This is based upon obtaining at least part of the classification property set by processing the resource's current content.

A classification property associated with a resource that is used for determining access to the resource is referred to as resource label. As described below, an entity requesting access to the resource provides one or more user claims that are evaluated against the resource label (or labels) to determine whether to grant or deny an access-related operation. Thus, for example, if a file's contents change, that file is reclassified whereby its resource may label change, thereby preventing access to users that do not have the appropriate user claim or claims for that changed resource label. As a more particular example, if a file is changed such that it now contains sensitive data, the file is reclassified producing a modified resource label that prevents access to those users who do not have a user claim allowing them access to such sensitive data.

It should be understood that any of the examples herein are non-limiting. Indeed, for purposes of explanation, access to resources in the form of files is generally described herein, however a file is only one type of resource; other resources may include any set of data such as parts of files, database rows and/or columns and the like, as well as physical entities such as computers and peripherals, and/or virtual entities such as application roles. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and resource access in general.

Figure 1:
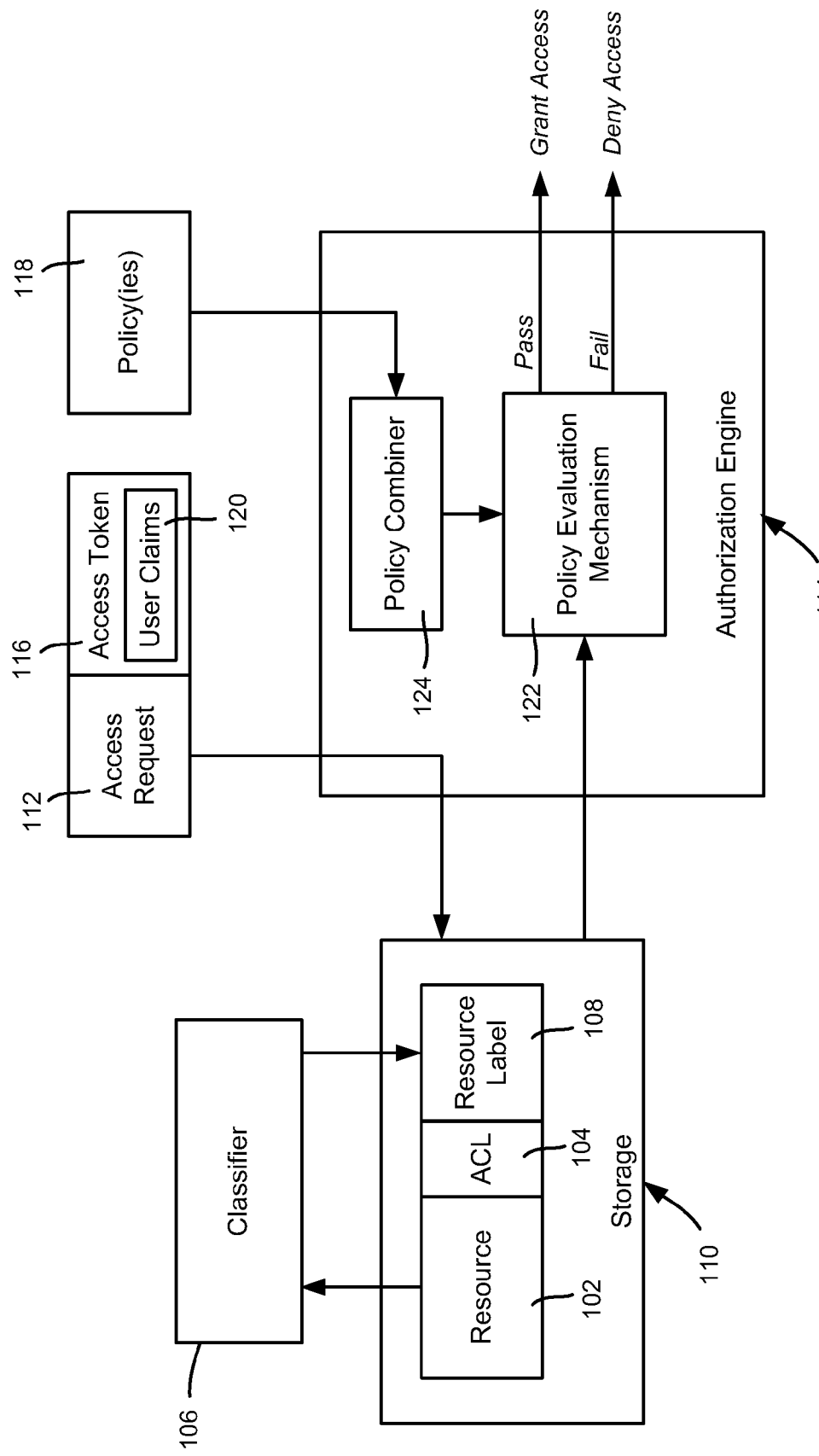
FIG. 1 is a block diagram representing example components in a computing environment for controlling resource access based on resource labels versus user claims.

FIG. 1 shows an example computing environment in which a resource 102, presently associated with an access control list (ACL) 104, is classified by a classifier 106 to obtain a classification property set including at least one resource label 108. Note that classification may result in obtaining a property set comprising many classification properties that are associated with the resource, and the property set may include more than one resource label, however for purposes of brevity/explanation only one resource label is shown in FIG. 1. For a file resource, the resource and ACL are maintained in a storage 110, which also may be used to cache the classification properties including the resource label 108.

Classification, which may include processing content of a data item, is further described in U.S. patent application Ser. No. 12/427,755, hereby incorporated by reference. This technology is implemented in Microsoft Corporation's Windows® Server 2008 R2 as the File Classification Infrastructure (FCI) for defining and assigning classification properties to files and specifying actions to apply to files on file servers based on these properties, and is available as part of the file server resource manager (FSRM) server role.

The resource label 108 is associated with the resource in some way, such as by a declarative classification rule that automatically assigns resource labels to documents according to some rules, by a reference pointer to a cache of classification properties, and/or by storing the resource label in an alternate data stream of a file resource, as described in U.S. patent application Ser. No. 12/605,451, entitled "Alternate Data Stream Cache for File Classification" hereby incorporated by reference. Note that resource labels may be inferred from classification rules, and are not necessarily stored, In general, the resource label 108 contains information that can be used in conjunction with user claims to apply policy. However, the cached resource label may be out-of-date or otherwise invalid. For example, there are a number of ways in which a cached resource label may be out-of-date, including if the file is modified or moved (thereby making the properties out-of-date); this thus includes content changes, and/or if the file is renamed or moved to another location within the file system (which may result in a classification change based on the new location). Another way a cached resource label becomes invalid is if the classification rules (described in the aforementioned U.S. patent application Ser. No. 12/427,755) used in the previous classification have since been modified, and/or if the internal state or configuration of modules that determine classification is modified. For example, even if the classification rules are unchanged, the ordering and/or way of combining two or more classification rules may change, and any such state change may result in a different file property classification result and thereby an invalid cached resource label.

Thus, before evaluating the resource label against the user claims, the cache resource label's validity and up-to-date-state is checked to determine whether reclassification is needed. If so, reclassification is performed, as described in the aforementioned U.S. patent applications. Note that part or all of the cached property set may be checked for validity and/or part or all of the resource reclassified to update the cached property set.

Turning to the application of policy by a resource label-aware security model, when an access request 112 for the resource 102 is received by a security authorization engine 114 (e.g., built into an operating system), the authorization engine 114 processes the request to see whether the access-related operation identified in the access request 112 is allowed. In one implementation, the access request 112 is associated with a conventional access token 116 that, depending on the policy or policies 118, may be evaluated against the resource's ACL 104.

As is known, conventional ACL-based security compares a resource's ACL against the token 116. However, ACL-based policy is basically static, and does not change according to the contents (e.g., the sensitivity of data) in the document. It is possible to have an external agent watch for content changes and appropriately change the ACL, however, this is impractical as it involves significant management complexity; e.g., such an agent has to watch and possibly change the policy for hundreds/thousands of files in case of any policy changes.

In contrast, as described herein, a resource label 108 versus user claims 120 evaluation provides a separation between the state of the document (e.g., its sensitivity, the project to which the file belongs, and so forth) and the policy 118 handling these labels. A policy change can be made centrally while maintaining the labels on the file.

Thus, as described herein, depending on the policy (or policies) 118, the user claims 120 may be evaluated against the resource label 108, which is based upon a current state of the resource, to determine whether the access-related operation is allowed. As represented in FIG. 1, a policy evaluation mechanism 122 (exemplified below with reference to FIG. 2) of the authorization engine 114 performs the security check, which may include evaluating the ACL 104 and/or the resource label 108 against the access token 116 including the user claims 120. The policy evaluation mechanism 122 grants or denies access in this example.

Shown for completeness in FIG. 1 is a policy combiner 124. In general, there may be many policy components for resource access, such as global policies, domain-specific policies, local policies, directory policies and so forth as defined across the organization and/or by the business owners. As is generally known in policy applications, concepts such as inheritance, override, blocking and so forth may be used to establish a combined policy for a resource. Nevertheless, while policies may thus be as complex as desired, as little as a single, straightforward policy may be used with the technology described herein, e.g., to grant access if the resource label and the ACL are met by the access token/user claims. At the same time, such a policy is easy to change, as the policy is separate from the individual resources.

In one implementation, the authorization engine 114 is based on Microsoft Corporation's Windows® 7 enhanced authorization runtime. The Windows® 7 runtime supports a conditional expressions language to specify complex policies using claims-based (name-value pairs-based) identities.

By way of example, the below policy (which can be rewritten into security descriptor definition language, or SDDL) states that XYZ company full-time employees can approve for approval amounts less than 10000 (dollars):

(XA;;APPROVE;;;WD;(member_of {SG_XYZ,SG_FTE} AND ApprovalAmount<10000)).

As an example of how policy is applied via labels and user claims as described herein, consider a company that wants to allow read access to documents carrying sensitive customer data by personnel (represented by membership in a security group) cleared to access sensitive customer data in the particular environment, such as the business unit hosting the files. This type of policy evaluates 'necessity' but not 'sufficiency' because the intent is not to allow the cleared personnel access to all sensitive customer data in the environment; rather access is only allowed when there is a business need to do so. This sufficiency policy is dictated by the ACL which is set according to the business needs of the document.

This kind of restriction is desired or required by government regulations in regulated industries such as Finance, Health care, Public sector and the like to prevent leakage of financial information, customer data and business critical data. As described above, policy enforcement using the current ACL model is not practical. The technology herein enforces policy without physically attaching the policy to the resource, thereby making it highly resilient, easily enforceable, and distributed across one or more collections of computers carrying business-sensitive data.

Continuing with the example of a company that wants to enforce access to specific user groups based on the resource label, to specify that only members of the group "SG_ClearedPrnl" can read files that carry a "customerData" claim, but otherwise anyone (with otherwise proper tokens for the resource's ACL) can read files without such data, the following may be set as the policy:

(XA;;GR;;;WD;(resource.Exists(customerData) AND member_of{SG_ClearedPrnl} OR NOT(resource.Exists (customerData)))

As can be seen, if a file contains customer data, read access is granted only to those users who are a member of the SG_ClearedPrnl group. If the file did not previously contain the customer data, but then was modified to include it, the file will be reclassified (due to the content change) and a resource label associated with that file that indicates that customer data exists in that file. Thus, the access changes based upon whether customer data exists in the file or not.

As another example, resource labels and user claims can be assigned levels, which may then be used in a comparative way to allow or disallow access to resource based on its classified level:

(XA;;GR;;;WD;
 (user.clearanceLevel>=resource.sensitivityLevel)

When the resource is first classified, the classification sets the sensitivity level in a resource label. The resource's sensitivity level (a value or the like corresponding to data in the resource label) is compared against the user's clearance level (a value or the like corresponding to data in the user claim) to determine whether the sensitivity level is achieved (whereby access is allowed). If the resource is changed in some way and subsequently reclassified, the sensitivity level in the resource label may change, thereby increasing or decreasing the clearance level needed to access the file.

Another example allows access to files for a user's projects, even if that user is not part of a security group that can access the file. For example an non-employee such as a consultant can be give access to a file that is otherwise only accessible to employees by the following policy (which can be rewritten in an appropriate language):

(XA;;GR;;;WD;(user.projects OVERLAP resource.projects))

Note that the above provides for evaluating compound conditions that include user claims and resource labels that allow for late binding resolution. One example is "User.Projects any_of Resource.Projects" or the like.

Figure 2:
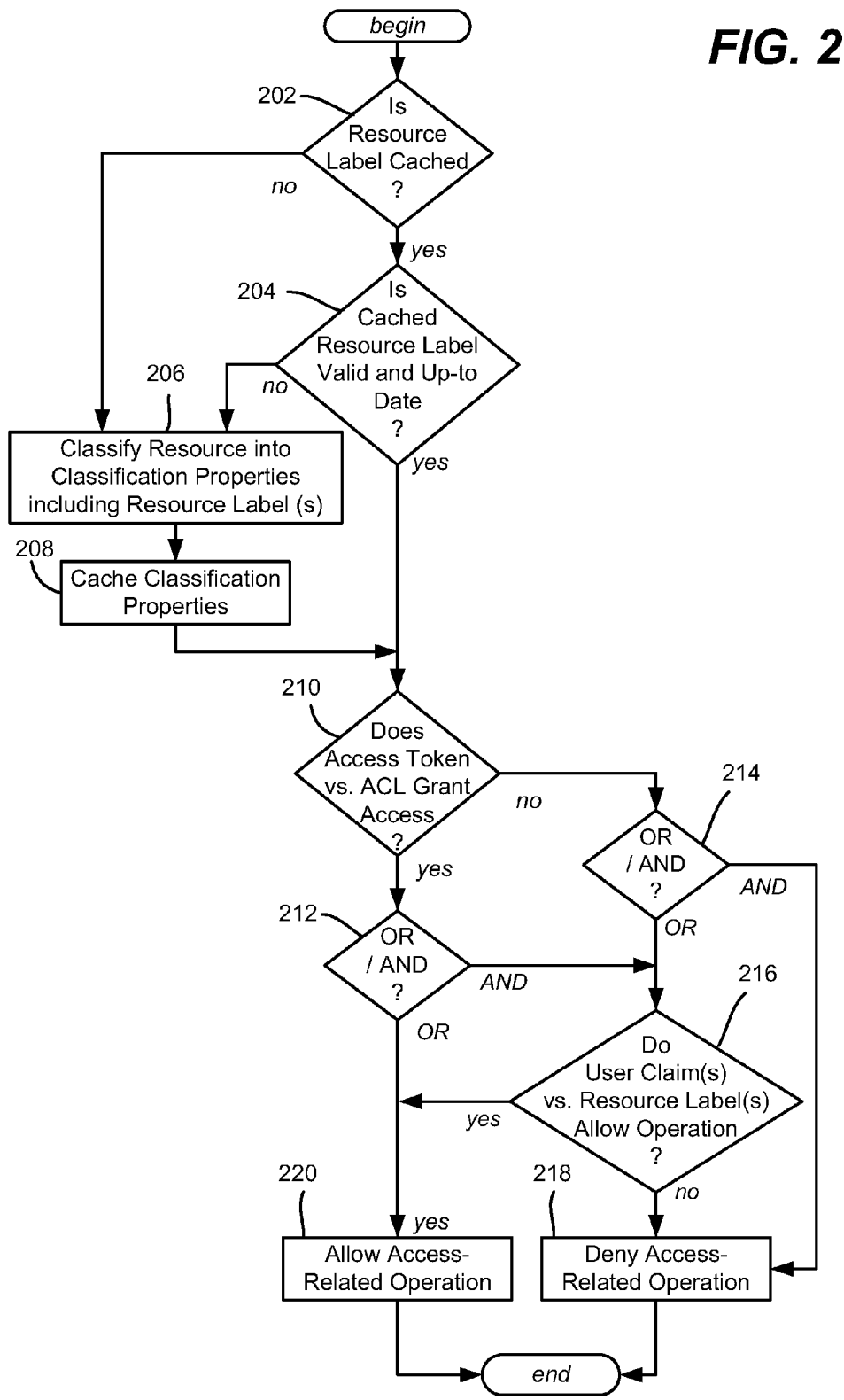
FIG. 2 is a flow diagram representing steps that may be taken by a security authority in granting access to a resource.

FIG. 2 shows a simplified example of how policy may be used to determine access to a resource based upon an ACL and/or resource label versus user claims. In FIG. 2, there are two possible policies exemplified for using the ACL and resource label, namely whether both the ACL and the resource label are needed for access (that is, an AND logical combination, such as being a member in a user group AND having sufficient clearance), or whether either one grants access (that is, OR logical combination, such as a being member in a user group OR being identified as associated with a project). Policy sets how the logic is applied to a given resource, and as can be readily appreciated, more complex logical combinations (NOT, XOR and so forth) are feasible. For example, a resource label can require user membership in multiple groups (compound principals) to obtain access. Other examples include conditions such as making a resource accessible only to proper users at certain times of day, in certain amounts (as logged elsewhere), and so forth.

Step 202 represents determining whether for a given resource the resource label is cached, that is, whether classification has previously been performed. If so, step 204 evaluates whether the resource label is valid and up-to-date or whether reclassification is needed, as generally described in the aforementioned Alternate Data Stream Cache for File Classification" patent application. If initial classification (step 202) or reclassification (step 204) is needed, step 206 is executed to classify/reclassify the resource. Step 208 represents caching the classification properties, including the resource label or labels, for subsequent use.

Step 210 represents evaluating the user's access token versus the resource's ACL, that is, performing the conventional access check. If access would be granted, step 212 evaluates whether that is sufficient by itself (the policy states ACL access OR resource label access) in this simplified example; if so, access is granted as represented by step 220. This corresponds to the "project" example, e.g., a user may gain access by user group claim (versus ACL) OR having a project user claim (versus resource label).

The other way to obtain access in the "project" example is if the ACL does not grant access at step 210, but the policy is "OR resource label" at step 214. If so, step 216 evaluates user access via the user claims versus the resource label at step 216. If the resource label allows access, step 216 branches to step 220 to allow access, else access is denied via step 218.

As set forth above, the logic of FIG. 2 also handles an "AND" combination, such as needing to be in a security group AND having clearance for sensitive data. As can be readily appreciated by following the "AND" branches of steps 212 and/or 214, access requires both the ACL check be passed and the resource label be passed. Note that classification can set a resource label for a file such that step 216 is automatically passed (unless later reclassified differently), e.g., the sensitivity level is zero so that everyone has clearance until otherwise reclassified.

Note that the requested access-related operation for a resource may be more than simple read or write (or execute) access. Using one of the above examples, a user may be requesting file access to copy the file in clear text to a portable storage device (e.g., directly or via a clipboard). Although read access may be allowed when within the boundary of the access policy (e.g., on a domain machine), copying in clear text may or may not be allowed depending on the current file contents as reflected in the resource label versus the requestor's user claims. In the other example, another requested access-related operation may be to attach a piece of data to an email message, which will also depend on the resource label versus the requestor's user claims. Such policies may be specified, and may be implemented in a suitably-equipped authorization engine/operating system.

Moreover, the access policy may move with a file, such as in a file's alternate data stream. For example, based on the nature of a file's content, it may be desirable to package the access policy along with the file when it moves out of the boundary of the access policy, so that policy is applied if the file is copied back again into a device that respects the access policy. To enforce this operation the file is protected (e.g., encrypted) when beyond the boundary of the access policy.

Other scenarios for access based on resource properties include maintaining access policy across repositories. When a file moves between different machines and repositories (e.g., move from a file server to SharePoint®), as long as the file maintains its labels, and as long as the file stays in the same policy domain where the classification label is referenced to the same access policy, the access policy is maintained.

As can be seen, there is provided the ability to enforce access policy that is based on user claims versus resource labels, including for applying access policy to a file based on classification properties of that file. The user claims and resource labels may be used in sophisticated condition sets such as clearance/sensitivity levels, and/or other logical combinations. This facilitates flexible and complex policies, including for compound principals and other conditions, which are not presently available in known systems.

EXEMPLARY OPERATING ENVIRONMENT

Figure 3:
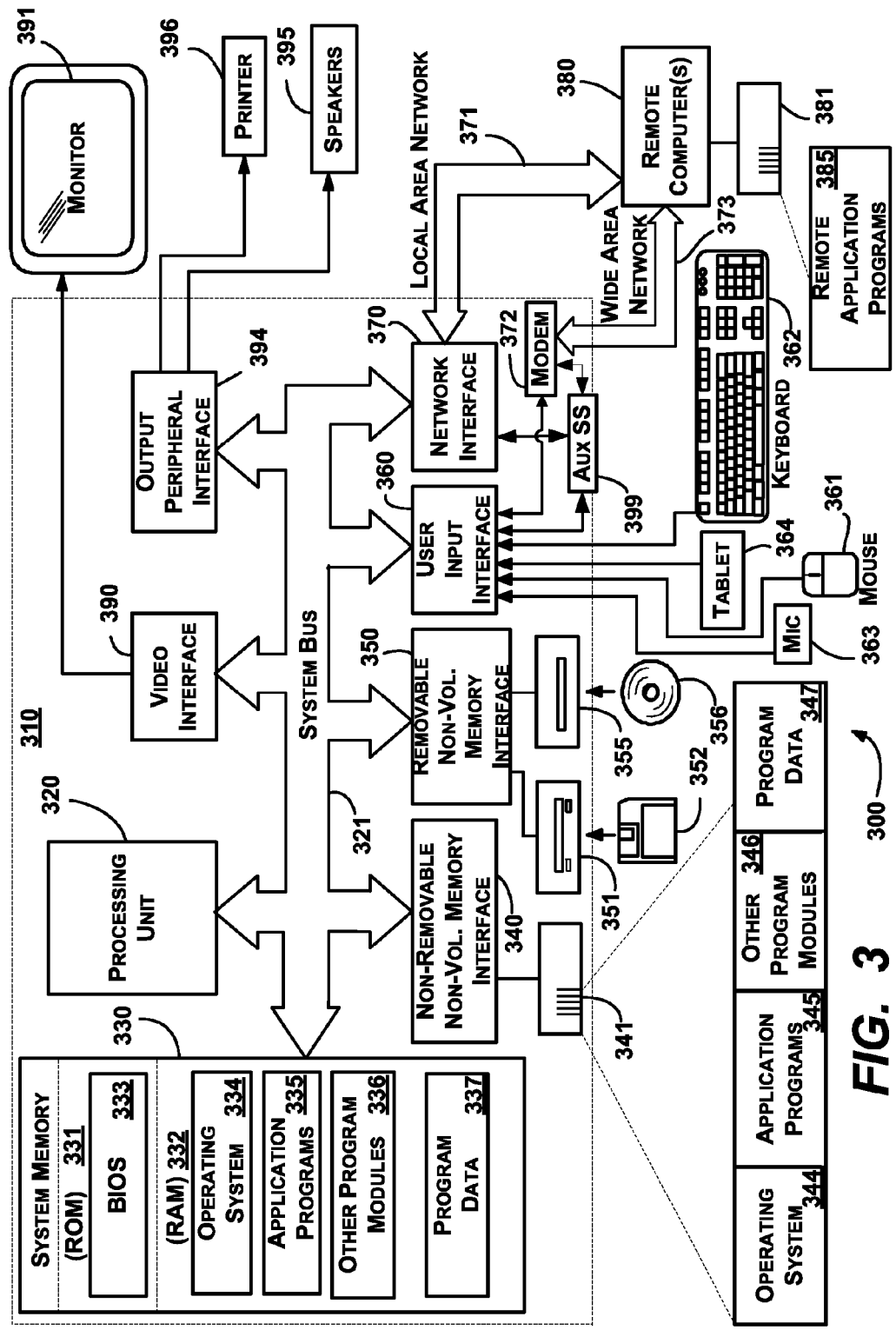
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   determining, by at least one processing unit, access to a resource based on policy decoupled from the resource, including by determining whether a resource label associated with the resource is cached, and if not, classifying the resource and caching the resource label, and if so, evaluating whether the resource label is valid or whether reclassification is needed, and evaluating the resource label associated with the resource against a user claim associated with an access request, wherein the resource label comprises a classification property associated with the resource that is used to determine access to the resource, and wherein the access request identifies the resource requested by the user claim;
   responsive to a determination that the resource label is not valid, prompting reclassification of the resource to obtain a valid resource label;
   responsive to a determination that the policy grants access to the resource based on the evaluation of the resource label and the user claim, allowing access to the resource; and
   responsive to a determination that the policy does not grant access to the resource based on the evaluation of the resource label and the user claim, denying access to the resource.

2. The method of claim 1 further comprising:
   determining whether granting access requires both access control list verification and resource label verification or if only one of the access control list verification or the resource label verification is sufficient for access to the resource.

3. The method of claim 2 wherein the classification rules comprise declarative instructions that assign certain resource labels to certain files.

4. The method of claim 1 wherein the resource is a file, and further comprising:
   performing reclassification of the resource to update the resource label based upon at least one of a change to content of the file, a change to one or more labels of the file, a change to other attributes of the file, a change to a location of the file, a change to a classification rule, or a state change to one or more classification rules.

5. The method of claim 1 further comprising:
further determining the access based on an access control list coupled to the resource.

6. The method of claim 1 wherein evaluating the resource label associated with the resource against the user claim associated with the access request comprises evaluating compound conditions.

7. The method of claim 1 further comprising:
evaluating one or more access-related operations corresponding to the access request and determining whether each of the one or more access-related operations is allowed based on at least one of the resource label and an access control list.

8. The method of claim 1 wherein evaluating the resource label against the user claim associated with the access request comprises determining whether a user clearance level value corresponding to data in the user claim achieves a resource sensitivity level value corresponding to data in the resource label.

9. In a computing environment, a system comprising:
one or more processors; and
an authorization engine configured to be executed by the one or more processors to determine access to a resource based upon a policy, the authorization engine configured to evaluate a resource label associated with the resource against a user claim associated with an access request using information in the policy, including to determine whether the resource label is valid or whether reclassification is needed to obtain an updated resource label, wherein the resource label comprises a classification property associated with the resource that is used to determine access to the resource, and wherein the access request identifies the resource requested by the user claim.

10. The system of claim 9 wherein the authorization engine is incorporated into a security model of an operating system.

11. The system of claim 9 wherein the policy is based upon a combination of policy components.

12. The system of claim 9 wherein the policy is maintained independent of the resource, and applies to a plurality of resources.

13. The system of claim 9 further comprising:
a classifier configured to provide one or more resource labels for the resource, the resource including a file, and the classifier further configured to provide the one or more resource labels by classifying the contents of the file, including a sensitivity level associated with the contents of the file.

14. The system of claim 9 wherein the resource is associated with an access control list, and wherein the authorization engine configured to evaluate the resource label against the user claim is further configured to evaluate the access control list against an access token to determine the access to the resource.

15. The system of claim 9 wherein the resource comprises a file and wherein the resource label is cached in an alternate data stream of the file.

16. One or more computer storage devices having computer-executable instructions stored thereon, which in response to execution by a computer, cause the computer to perform steps comprising:
processing an access request to grant or deny access to a resource, including evaluating one or more access-related operations corresponding to the access request, obtaining a policy that is decoupled from the resource, and using the policy to determine whether to grant or deny each of the one or more access-related operations, including by evaluating a resource label associated with the resource against a user claim associated with the access request, wherein the resource label comprises a classification property associated with the resource that is used to determine access to the resource, and wherein the access request identifies the resource requested by the user claim.

17. The one or more computer storage devices of claim 16 wherein the resource is a file, and having further computer-executable instructions comprising, classifying the file into classification properties, including a classification property corresponding to the resource label.

18. The one or more computer storage devices of claim 16 wherein the resource is a file, wherein the resource label is cached in association with the file, and having further computer-executable instructions comprising:
determining whether the resource label is valid and up-to-date;
responsive to a determination that the resource label is not valid and up-to-date, obtaining a valid and up-to-date resource label; and
caching the valid and up-to-date resource label in association with the file.

19. The one or more computer storage devices of claim 16 wherein a plurality of policies are applicable, and wherein using the policy to determine whether to grant or deny the access-related operation further comprises logically combining a result of evaluating a resource label associated with the resource against a user claim with a result of at least one other policy evaluation.

20. The one or more computer storage devices of claim 19 wherein a result of at least one other policy evaluation comprises an access control list-based evaluation result.

* * * * *